United States Patent [19]

Peters

[11] Patent Number: 5,609,320

[45] Date of Patent: Mar. 11, 1997

[54] METHOD AND APPARATUS FOR MOUNTING A BOWLING SCORING MONITOR

[75] Inventor: Michael D. Peters, Westbend, Wis.

[73] Assignee: Brunswick Bowling & Billiards Corporation, Muskegon, Mich.

[21] Appl. No.: 370,031

[22] Filed: Jan. 9, 1995

[51] Int. Cl.$^6$ ........................................... A47H 1/10
[52] U.S. Cl. ............................................ 248/329; 248/328
[58] Field of Search ................................ 248/329, 328, 248/327, 330.1, 320, 340, 544, 917; 254/342, 343, 390

[56] References Cited

U.S. PATENT DOCUMENTS 5,263,687  11/1993  Garbiso .................................. 248/327

*Primary Examiner*—Karen J. Chotkowski
*Assistant Examiner*—Gwendolyn A. Wrenn
*Attorney, Agent, or Firm*—Price, Heneveld, Cooper, DeWitt and Litton

[57] ABSTRACT

A method and apparatus for mounting and dismounting an overhead bowling scoring monitor. The method includes positioning a support member at the overhead location for the bowling scoring monitor and providing a lifting mechanism having an elongated lifting member and a force-producing member for extending and retracting the lifting member. The lift mechanism is attached to the bowling scoring monitor and to any stationary member above the monitor and the force-producing device is operated in order to retract the lifting member to raise the overhead bowling scoring monitor into proximity with the support member, or to pay out the lifting member to lower the overhead bowling scoring monitor from the support member. Preferably, the support member is a rigid frame which is substantially horizontally planar. The rigid frame may include at least two spaced apart parallel tubular members in a manner that the elongated lifting member extends from the elongated body between the two tubular members. The mounting apparatus allows a technician to mount or dismount an overhead bowling scoring monitor from its perch juxtaposed with ceiling of the bowling center with the use of only readily available tools, which may include a step ladder, power drill or other hand tools.

13 Claims, 4 Drawing Sheets

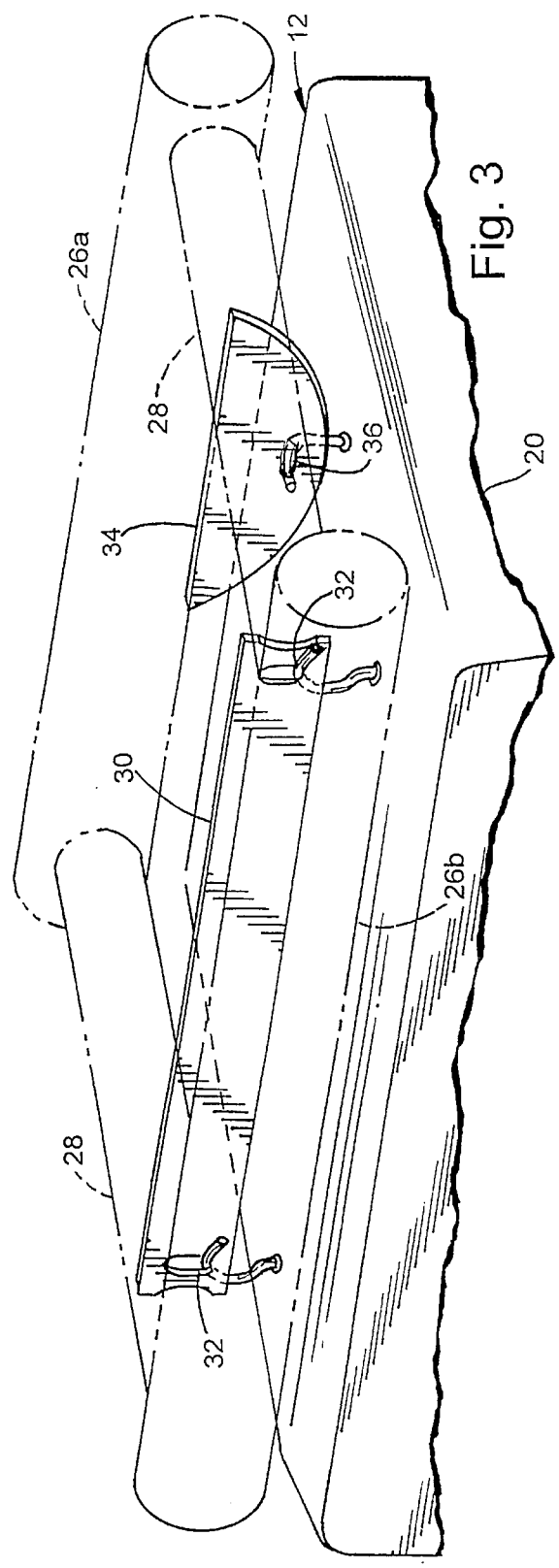
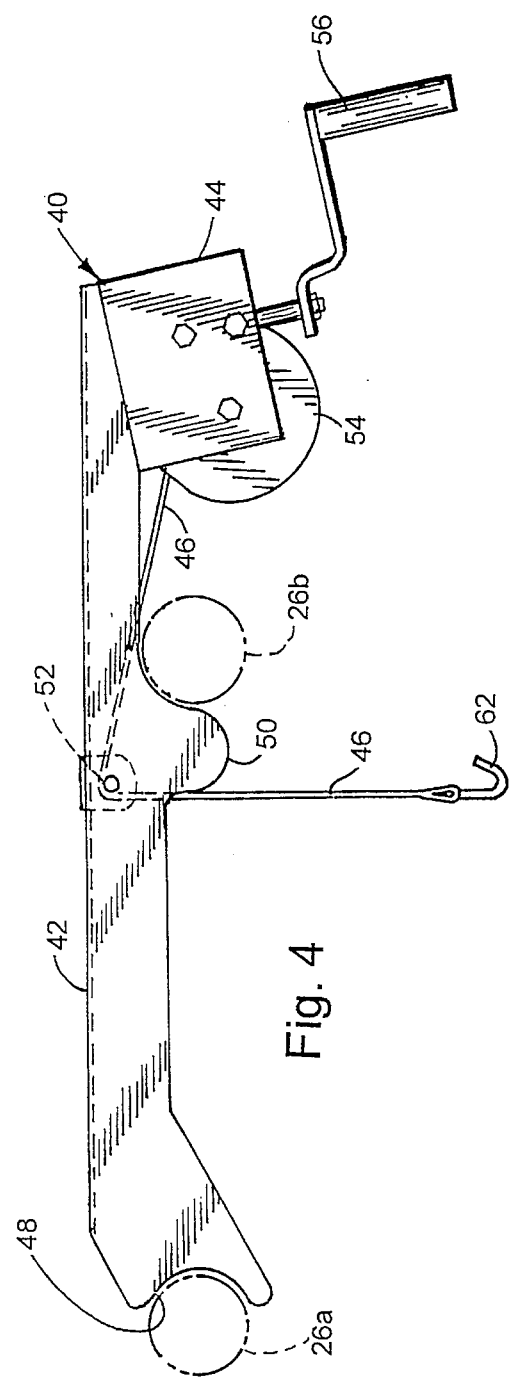

METHOD AND APPARATUS FOR MOUNTING A BOWLING SCORING MONITOR

BACKGROUND OF THE INVENTION

This invention relates generally to bowling automatic scoring systems and, more particularly, to overhead monitors for displaying video information generated by the scoring system. More particularly, the invention relates to a technique for mounting the overhead monitors to a stationary member, such as structural supports of a ceiling.

Automatic scoring systems for bowling centers have been provided which respond to outputs produced by a pin-fall monitor in order to automatically score each bowler's game. The automatic scoring system typically includes a scoring console having a keyboard and a CRT display associated with a pair of lanes for entering the names of the bowlers, correcting scoring errors, and the like. The CRT display may also display videos, including the scores of the bowlers, as well as various other materials, such as exciter graphics, instant replay of the bowler, and the like. Such systems typically include overhead monitors, which display the same video displayed on the scoring console display, in order to allow viewing by a larger group including other bowling teams, spectators, and the like. One such system is disclosed in commonly owned U.S. Pat. No. 5,255,185 for a BOWLING CENTER VIDEO DISPLAY SYSTEM, the disclosure of which is hereby incorporated herein by reference.

One common difficulty associated with overhead monitors for a bowling scoring system includes the removal of the monitor from its perch close to the ceiling, for repair or replacement, and subsequent replacement of the monitor on its perch juxtaposed with the ceiling. Because such monitors are viewed from a distance, they are relatively large and are often mounted in banks of two or three monitors. Accordingly, in order to remove a monitor and/or mount a monitor, it is common to utilize motorized hydraulic lifting equipment positioned on the lane area below each monitor. Because such motorized hydraulic equipment is expensive and bulky, it is common practice to rent such equipment when needed rather than keep such equipment available at the bowling center. As a result, needed repairs are often delayed so that optimum use may be made of the rented equipment. The result is that non-functional monitors are kept in the system longer than desirable.

SUMMARY OF THE INVENTION

The present invention provides a safe, low-cost, and easy-to-use technique for mounting and dismounting an overhead bowling scoring monitor.

A method of mounting and dismounting an overhead bowling scoring monitor, according to the invention, includes positioning a support member at the overhead location for the bowling scoring monitor and providing a lifting mechanism having an elongated lifting member and a force-producing member for extending and retracting the lifting member. The lift mechanism is attached to the bowling scoring monitor and to any stationary member above the monitor and the force-producing device is operated in order to retract the lifting member to raise the overhead bowling scoring monitor into proximity with the support member, or to pay out the lifting member to lower the overhead bowling scoring monitor from the support member.

Preferably, the support member is a rigid frame which is substantially horizontally planar. The rigid frame may include at least two spaced apart parallel tubular members and at least two support struts extending between the tubular members. The lifting mechanism preferably includes an elongated body that spans the two tubular members in a manner that the elongated lifting member extends from the elongated body between the two tubular members. The force-producing device preferably includes a mechanical crank that is rotatably attached to the elongated body outside of the two tubular members, although various force-producing devices are comprehended within the scope of the invention. The lifting mechanism elongated body may include an open socket at one end having the same general configuration as a cross section of one of the tubular members and a protrusion adjacent the other of the two tubular members located in a manner that will abut the other of the tubular members and thereby retain the one tubular member in the socket.

The invention allows a technician to mount or dismount an overhead bowling scoring monitor from its perch juxtaposed with the ceiling of the bowling center with the use of only readily available tools, which may include a step ladder, power drill, or other hand tools. The monitor may be raised safely and effortlessly in a rapid manner. Thus, malfunctioning or obsolete monitors may be removed or repaired and new monitors added without requiring extensive downtime to the lanes and without requiring the rental or purchase of expensive and bulky motorized hydraulic equipment.

These and other objects, advantages, and features of this invention will become apparent upon review of the following specification in conjunction with the drawings.

BRIEF DESCRIPTION OF THE DRAWINGS

FIG. 3 is a perspective view of a support member and suspension hardware, according to the invention;

FIG. 4 is a side view taken from the general direction IV—IV in FIG. 6 of a lifting mechanism mounted to a support member, according to the invention;

DESCRIPTION OF THE PREFERRED EMBODIMENT

Figure 1:
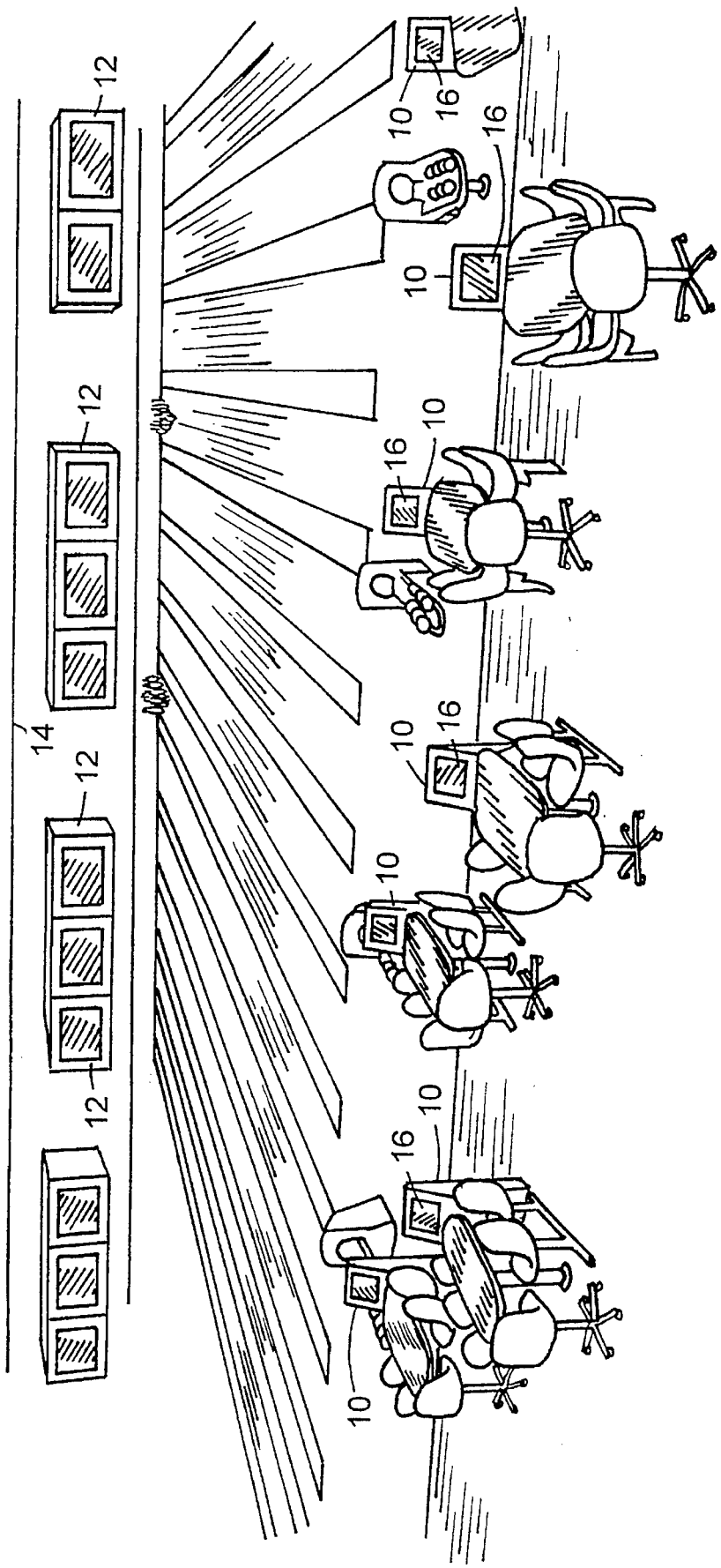
FIG. 1 is a perspective view of a bowling center, including an automatic bowling scoring system useful with the invention.

Referring now specifically to the drawings, and the illustrative embodiments depicted therein, a bowling center illustrated in FIG. 1 includes an electronic automatic scoring system having a plurality of scoring consoles 10 and a plurality of overhead monitors 12, the latter suspended from structural support members, such as steel trusses (not shown), in a ceiling generally shown at 14. Each scoring console 10 may include data entry means, such as a keyboard (not shown), and a built-in display 16 in order to display bowling scores, as well as other video information, as is known in the art. An example of such electronic automatic scoring system is disclosed in U.S. Pat. No. 5,255,185 issued to David Mowers et al. for a BOWLING CENTER VIDEO DISPLAY SYSTEM, the disclosure of which is hereby incorporated herein by reference.

Figure 2:
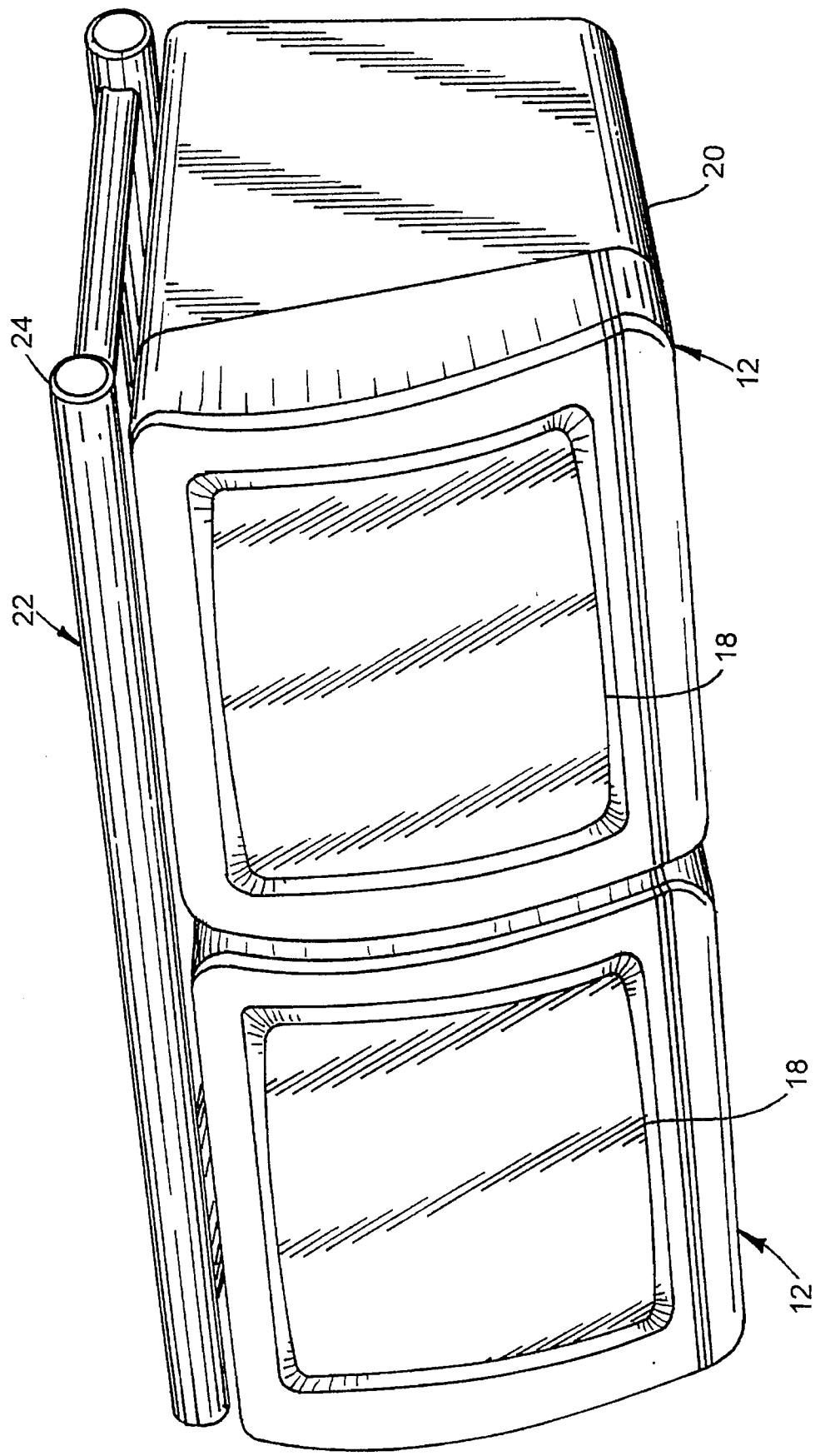
FIG. 2 is a perspective view of an overhead bowling scoring monitor incorporating a mounting apparatus, according to the invention.
Figure 5:
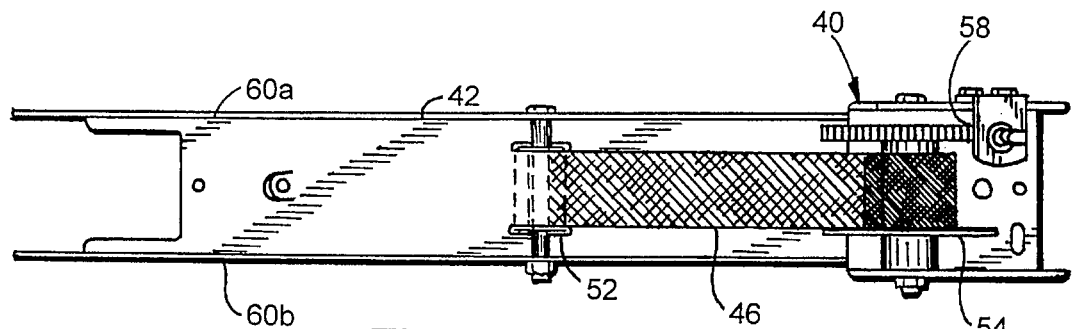
FIG. 5 is a top view of the lifting mechanism in FIG. 4.

Each overhead monitor 12 includes a video display terminal 18 positioned within a housing, or cabinet 20 (FIG. 2). Each monitor 12 is suspended from ceiling 14 by a mounting system generally shown at 22. Monitors 12 are suspended from mounting system 22 individually or in groups of two, three, or more monitors. Mounting system 22 is, in turn, suspended from support members, such as trusses (not shown), in ceiling 14 by suspension means (not shown), such as rods, wires, straps, brackets, or the like.

Mounting system 22 includes a support member 24, which, in the illustrated embodiment, is a rigid frame that is made up of two or more spaced apart parallel tubular members 26a, 26b interconnected by two or more parallel spaced apart support struts 28 (FIGS. 3–6). When more than one overhead monitor 12 is supported by mounting system 22, a suitable number of support struts 28 are provided in order to allow each overhead monitor to be positioned between a pair of support struts. For each overhead monitor 12, a suspension bracket 30 is mounted between support struts 28 in order to suspend a forward portion of the monitor by suitable attachment means, such as hook-and-slot fastening pairs 32. A suspension plate 34 attached to tubular member 26a provides a support at a rearward portion of overhead monitor 12 via attachment by a suitable fastener 36, such as a hook-and-slot fastener. This provides a three-point mounting for the overhead monitor, which is secure yet allows easy attachment and removal merely by raising the monitor closer to the support member 24.

Mounting system 22 further includes a lifting mechanism 40, which is configured to be supported above rigid frame 24. Lifting mechanism 40 includes an elongated body 42 to which is mounted a force-producing device 44 and an elongated lifting member 46 which is extended or retracted with respect to body 42 by force-producing device 44. Elongated body 42 includes an open socket 48 at one end thereof having the same general configuration as the cross section of tubular member 26a. A protrusion 50 extending downward from body 42 is positioned in order to abut tubular member 26b in a manner which forces socket 48 against tubular member 26a. This provides a stable positioning of lifting mechanism 40 on rigid frame 24 without requiring separate fasteners. Force-producing device 44 is positioned outwardly of tubular member 26b, which allows convenient access to the force-producing device. Lifting member 46 extends from force-producing device 44 around a pulley 52 and extends downwardly between tubular members 26a and 26b. Pulley 52 is preferably positioned above the front-to-back center of gravity of monitor 12.

In the illustrated embodiment, force-producing device 44 is a winch mechanism made up of a reel 54 and a hand crank 56 which rotates reel 54 subject to a mechanical force amplification provided by gear set 58. Lifting member 46, which, in the illustrated embodiment, is made up of a woven fabric strap, is wound around reel 54 selectively in response to rotation of crank 56. In the illustrated embodiment, pulley 52 is made from a section of PVC pipe which is mounted by a bolt extending between sidewalls 60a and 60b of elongated body 42. Although force-producing device 44 is illustrated as a mechanical hand crank, other embodiments will suggest themselves to those skilled in the art. For example, force-producing device 44 could be implemented by a socket head which is engaged by a portable drill motor in order to rotate reel 54. Of course, the force amplification by gear set 58 would be suitably selected to accommodate the speed and torque of the drill motor. As another embodiment, force-producing device 44 could be implemented by an electric motor permanently mounted to elongated body 42 with appropriate gearing between the motor and reel 54.

Figure 6:
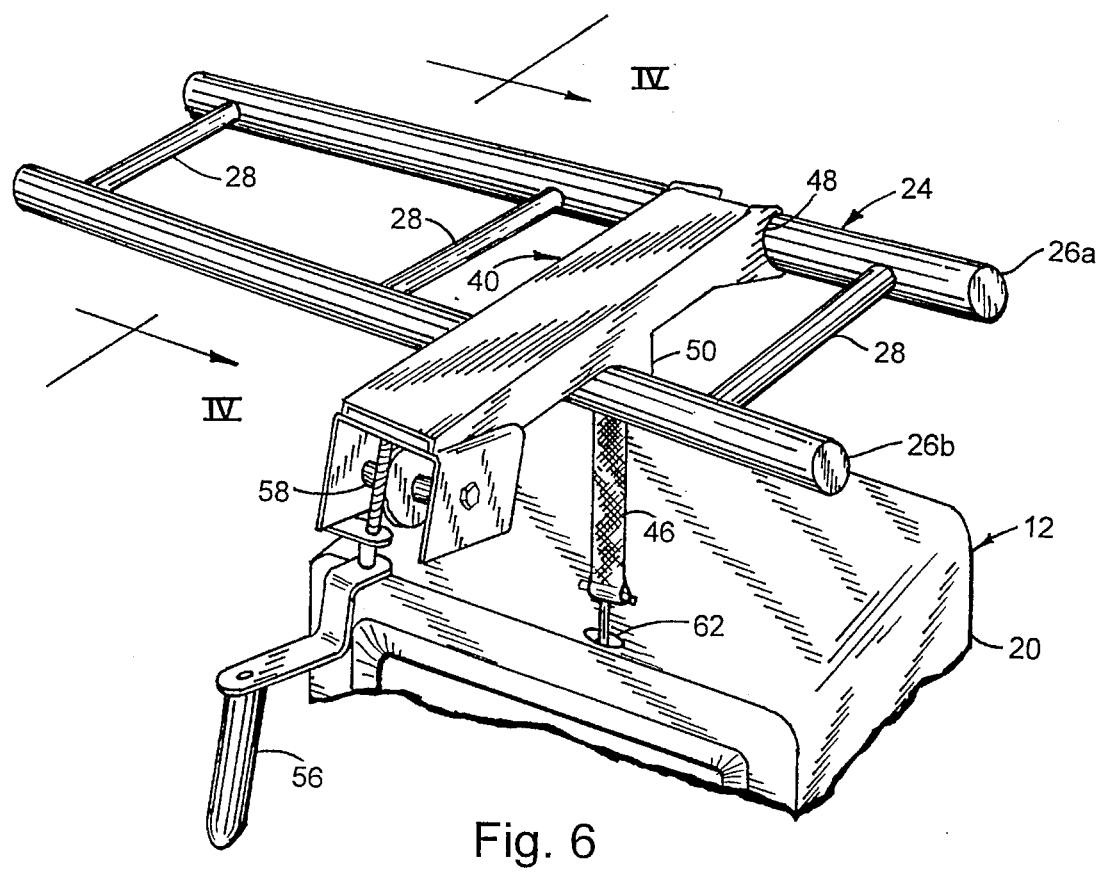
FIG. 6 is a perspective view of a mounting apparatus, according to the invention, illustrating the raising or lowering of an overhead bowling scoring monitor.

As best seen in FIG. 6, with lifting mechanism 40 positioned on tubular members 26a, 26b and centered between struts 28, lifting member 46 is attached to overhead monitor 12 by suitable fastener 62. If the overhead monitor is being dismounted, crank 56 is initially rotated in a direction that will retract lifting member 46 and thereby raise the monitor in order to allow disengagement of fasteners 32 and 36. With the fasteners disengaged, the monitor is free of the rigid frame 24. Crank 56 is then rotated in the opposite direction in order to pay out lifting member 46 and thereby lower monitor 12 to the surface of the bowling alley, or suitable cart, or the like. In order to mount the monitor into position above the alleys as illustrated in FIG. 1, the lifting member 46 is attached to the monitor 12 and the crank 56 rotated in a direction to retract lifting member 46. This will raise the monitor. The crank is rotated until the monitor is adjacent rigid frame 24. Fasteners 32 and 36 are then engaged and the crank 56 rotated in the opposite direction in order to seat the fasteners, as illustrated in FIG. 3.

In the illustrated embodiment, lifting mechanism 40 is a removable member which is supported above the rigid frame only when it is desired to mount or dismount an overhead monitor. Alternatively, lifting mechanism 40 could be built into rigid frame 24 above each monitor. As yet a further alternative embodiment, lifting mechanism 40 could be attached to overhead monitor 12 with the lifting member 46 engaging rigid frame 24.

Other changes and modifications in the specifically described embodiments can be carried out without departing from the principals of the invention which is intended to be limited only by the scope of the appended claims, as interpreted according to the principles of patent law including the doctrine of equivalents.

The embodiments of the invention in which an exclusive property or privilege is claimed are defined as follows:

1. A method of mounting and dismounting an overhead bowling scoring monitor including:

positioning a support member at the overhead location for the bowling scoring monitor;

said support member being a rigid frame;.

said rigid frame being substantially horizontally planar; and said rigid frame including at least two spaced apart parallel tubular members and at least two support struts extending between said tubular members;

providing a lifting mechanism having an elongated lifting member and a force-producing device for extending and retracting said lifting member;

said lifting mechanism including an elongated body that spans said at least two tubular members;

attaching said lifting mechanism to said bowling scoring monitor and to said support member located above the bowling scoring monitor, wherein retraction of said lifting member will raise the bowling scoring monitor toward said support member; and operating said force-producing device in order to raise the bowling scoring monitor into proximity with said support member.

2. The method of claim 1 wherein said elongated body includes an open socket at one end having the same general configuration as a cross section of one of said at least two tubular members and a protrusion adjacent the other of said at least two tubular members and located in a manner that will abut said other of said at least two tubular members and thereby retain said one of said at least two tubular members in said socket.

3. The method of claim 1 wherein said lifting member extends from said elongated body between said at least two tubular members.

4. The method of claim 3 wherein said force-producing device includes a mechanical crank that is rotatably attached to said elongated body outside of said at least two tubular members.

5. The method of claim 1 wherein said lifting member is a woven fabric strap.

6. An apparatus for mounting an overhead bowling scoring monitor, comprising:

a support member positioned at the overhead location for the bowling scoring monitor;

a lifting mechanism having an elongated lifting member and a force-producing device for retracting said lifting member in order to raise the bowling scoring monitor into proximity with said support member;

said support member being a rigid frame;

said rigid frame being substantially horizontally planar and including at least two spaced apart parallel tubular members and at least two support struts extending between said tubular members; and said lifting mechanism including an elongated body that spans said at least two tubular members.

7. The apparatus in claim 6 wherein said lifting member extends from said elongated body between said at least two tubular members.

8. The apparatus in claim 7 wherein said force-producing device includes a mechanical crank that is rotatably attached to said elongated body outside of said at least two tubular members.

9. The apparatus in claim 6 Wherein said elongated body includes an open socket at one end having the same general configuration as a cross section of one of said at least two tubular members and a protrusion adjacent the other of said at least two tubular members and located in a manner that will abut said other of said at least two tubular members and thereby retain said one of said at least two tubular members in said socket.

10. An apparatus for mounting an overhead bowling scoring monitor, comprising:

a rigid frame made up of at least two spaced apart tubular members and at least two support struts extending between said tubular members; and a lifting mechanism including an elongated body that spans said at least two tubular members, an elongated lifting member extending from said body and a force-producing device for retracting and paying out said lifting member.

11. The apparatus in claim 10 wherein said elongated body includes an open socket at one end having the same general configuration as a cross section of one of said at least two tubular members and a protrusion adjacent the other of said at least two tubular members and located in a manner that will abut said other of said at least two tubular members and thereby retain said one of said at least two tubular members in said socket.

12. The apparatus in claim 10 wherein said lifting member is a woven strap.

13. The apparatus in claim 10 wherein said force-producing device includes a mechanical crank that is rotatably attached to said elongated body outside of said at least two tubular members.

* * * * *